United States Patent [19]
Takahashi

[11] Patent Number: 6,023,409
[45] Date of Patent: Feb. 8, 2000

[54] WIRING BOARD MOUNTING STRUCTURE FOR ELECTRICAL JUNCTION BOX

[75] Inventor: Toshiharu Takahashi, Shizuoka, Japan

[73] Assignee: Yazaki Corporation, Tokyo, Japan

[21] Appl. No.: 09/030,918

[22] Filed: Feb. 26, 1998

[30] Foreign Application Priority Data

Mar. 7, 1997 [JP] Japan .................................. 9-053570

[51] Int. Cl.[7] .................................................. H02B 1/26
[52] U.S. Cl. .......................................... 361/641; 439/76.1
[58] Field of Search .................................. 174/51, 138 G, 174/138 H, 138 J; 361/600, 641, 679, 741, 752, 756, 774, 776, 789; 439/68, 75, 95, 76.1, 76.2, 861, 862, 876

[56] References Cited

U.S. PATENT DOCUMENTS

| | | | |
|---|---|---|---|
| 3,631,299 | 12/1971 | Meyer | 439/76.1 |
| 3,911,328 | 10/1975 | Haury et al. | 439/76.1 |
| 4,629,267 | 12/1986 | Stepan | 439/861 |
| 4,718,853 | 1/1988 | Orbanic | 439/35 |

FOREIGN PATENT DOCUMENTS 2736169  2/1979  Germany .................................. 439/76

*Primary Examiner*—Gregory Thompson
*Attorney, Agent, or Firm*—Sughrue, Mion, Zinn, Macpeak & Seas, PLLC

[57] ABSTRACT

In a wiring board mounting structure for an electrical junction block which includes a body in which an electrical circuit is formed, and a wiring board in which another electrical circuit is formed, the wiring board being coupled to the body to complete the connection of the electrical circuits, bosses are provided for the body and positioning holes are provided for the wiring board to guide the wiring board to a predetermined mounting position. Further, stationary terminals are protruded from the body, and elastic terminals, which elastically contact the stationary terminals when the wiring board is set at the mounting position in the body, are protruded from the wiring board.

4 Claims, 3 Drawing Sheets

WIRING BOARD MOUNTING STRUCTURE FOR ELECTRICAL JUNCTION BOX

BACKGROUND OF THE INVENTION

1. Field of the Invention

This invention relates to a wiring board mounting structure for an electrical junction block which is mounted on an automobile or the like.

2. Description of the Related Art

In an automobile, in order to decrease the number of circuit branches of a wire harness, or to accommodate the electrical circuit of a particular control system, electrical junction blocks are mounted.

FIG. 7 is a sectional view showing a conventional wiring board mounting structure of an electrical junction block. In a body 3 of the electrical junction block 1, an electrical circuit for distribution of the electrical power is formed with a bus bar 5. A wiring board (or relay board) 11, on which a fuse 7 and a relay 9 are mounted, is mounted on the body 3. A body side tab 13, which is connected to the bus bar 5, is protruded from the body 3. A board side tab 15, which is connected to the fuse 7 or relay 9, is protruded from the relay board 11. The body 3, the fuse 7, and the relay 9 are electrically connected to one another by spot-welding the body side tab 13 and the board side tab 15, which are adjacent to each other, with the relay board 11 mounted on the body 3. As was described above, in the conventional wiring board mounting structure for an electrical junction block, the tabs are spot-welded to each other. Hence, it is difficult to remove relay board 11 from the body 3, and therefore for instance in the case where the relay 9 is broken, it must be replaced together with the body 3. In this case, other normal (not broken) components must be discarded together with the body. That is, the conventional wiring board mounting structure is not economical.

Furthermore, since a number of pairs of tabs must be spot-welded, the assembling of the conventional wiring board mounting structure is low in work efficiency.

SUMMARY OF THE INVENTION

In view of the foregoing, an object of the invention is to provide a wiring board mounting structure for an electrical junction block which can be detachably mounted while its electrical connection is maintained unchanged in reliability, and can be mounted with ease, and which is improved in economical use in replacement of broken components, and in efficiency in the assembling work thereof.

In order to achieve the above object, the invention provides a wiring board mounting structure for an electrical junction block which comprises a body in which an electrical circuit is formed, and a wiring board in which another electrical circuit is formed, the wiring board being coupled to the body to complete connection of the electrical circuits, the wiring board mounting structure comprising: position regulating means provided for the body and the wiring board for guiding the wiring board to a predetermined mounting position; a stationary terminal protruded from one of the body and the wiring board; and an elastic terminal protruded from the other of the body and the wiring board, the elastic terminal elastically contacting the stationary terminal when the wiring board is set at the mounting position in the body.

DETAILED DESCRIPTION OF THE PREFERRED EMBODIMENT

A wiring board mounting structure for an electrical junction block, which constitutes a preferred embodiment of the invention, will be described with reference to the accompanying drawings.

Figure 1:
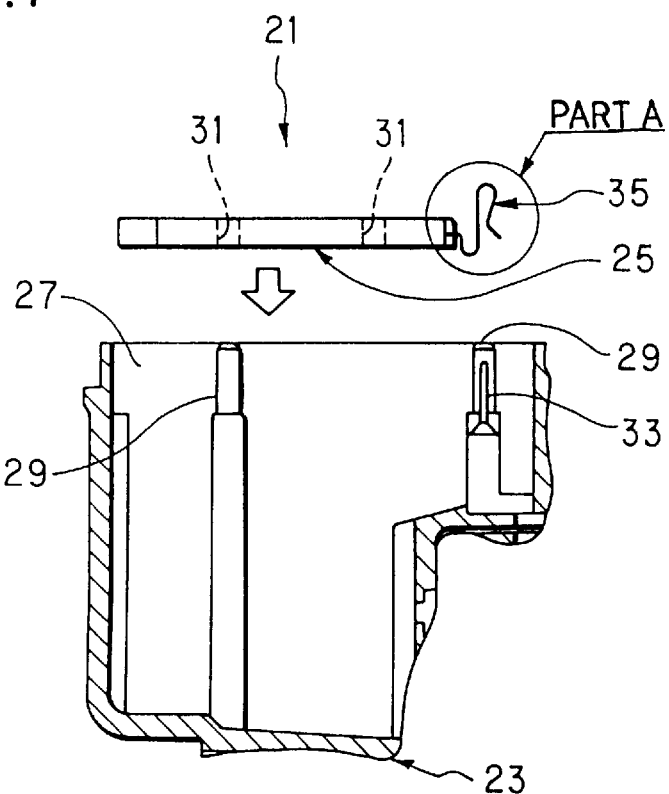
FIG. 1 is an exploded sectional view of a wiring board mounting structure according to the invention.
Figure 2:
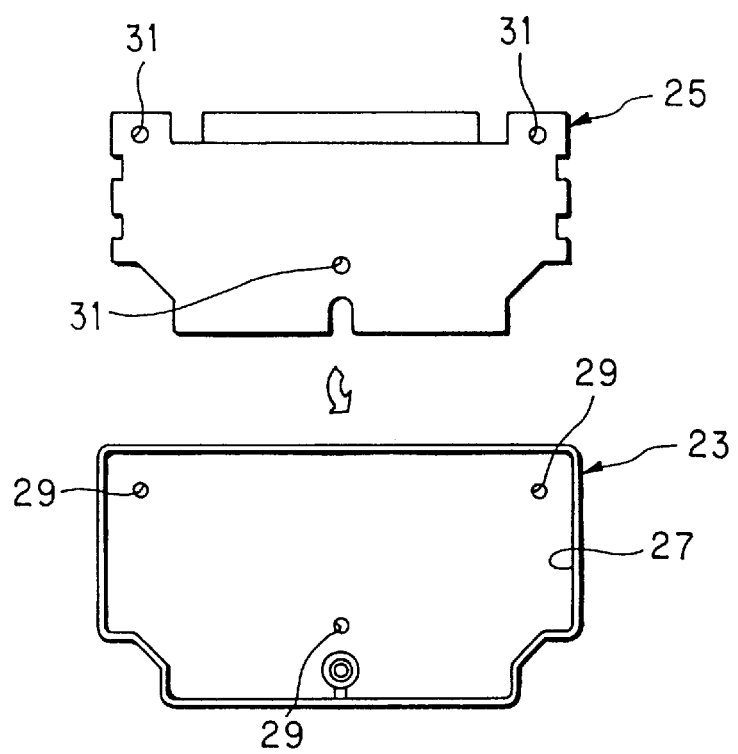
FIG. 2 is a plan view of a wiring board and a body in the wiring board mounting structure shown in FIG. 1.
Figure 3:
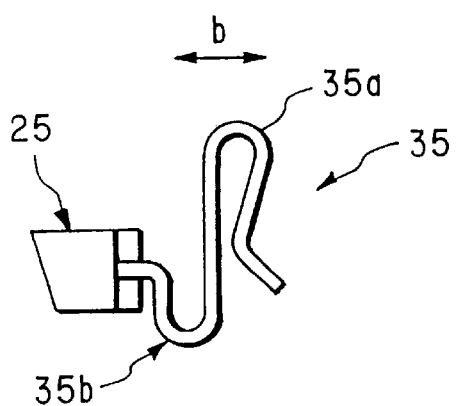
FIG. 3 is an enlarged view of the part "A" in FIG. 1.

In FIGS. 1, 2 and 3, reference numeral 21 designates an electrical junction block which comprises a box-shaped body 23 of resin material or the like, and a wiring board (or relay board) 25 on which a fuse (not shown), a relay (not shown), etc. are mounted. In the body 23, an electrical circuit (not shown) for power distribution is made up of a bus bar. In addition, on the relay board 25, a circuit (not shown) for connection of a fuse (not shown), a relay (not shown), etc. is formed by printing.

The upper end portion of the body 23 is formed into a relay board mounting section 27 which is opened substantially equal in configuration to the relay board 25. The relay board mounting section 27 has at least two (three in the embodiment) position regulating means (bosses) 29. The bosses 29 are fitted in position regulating means (positioning holes) 31 which are formed in the relay board 25 when the relay board 25 is engaged with the relay board mounting section 27. As the bosses 29 are fitted in the positioning holes 31, the relay board 25 is guided to a predetermined mounting position in the relay board mounting section 27. Therefore, the relay board 25 position-regulated by the bosses 29 is parallel-moved only in the direction of protrusion of the bosses 29 when mounted.

In the body 23, a plurality of stationary terminals 33, which are connected to the bus bar, are extended in the direction in which the relay board 25 is mounted. On the other hand, elastic terminals 35, which are connected to the relay, the fuse, etc., are protruded in correspondence to the stationary terminals 33. Each of the stationary terminals 33 has a sharp head, and is extended linearly. On the other hand, each of the elastic terminals 35 is substantially S-shaped as shown in FIG. 3. More specifically, the elastic terminal 35 includes a pointed end portion (or upper bent portion) which is an elastic contact portion 35a, and a base end portion (or lower bent portion) which is a position shift absorbing portion 35b.

The stationary terminals 33 of the body 23, and the elastic terminals 35 of the relay board 25 are so designed that, when the relay board 25 is set at the predetermined position in the relay board mounting section 27, the pointed ends of the stationary terminals 33 meet the elastic contact portions 35a. Each of the elastic contact portions 35a is inverted-U-shaped, so that it is engaged with the upright (erected) stationary terminal 33 from above. The gap between the prongs of the elastic contact portion 35a is slightly smaller than the thickness of the stationary terminal 33. Hence, the stationary terminal 33 is press-fitted in the elastic contact portion 35a.

As is apparent from the above description, the elastic terminal 35 has the position shift absorbing portion 35b between the elastic contact portion 35a and the relay board 25. The position shift absorbing portion 35b is bent U-shaped. Therefore, the elastic contact portion 35a which is coupled through the position shift absorbing portion 35b to the relay board 25, is movable to and from the relay board 25 (in the directions of the arrow b in FIG. 3).

Figure 4:
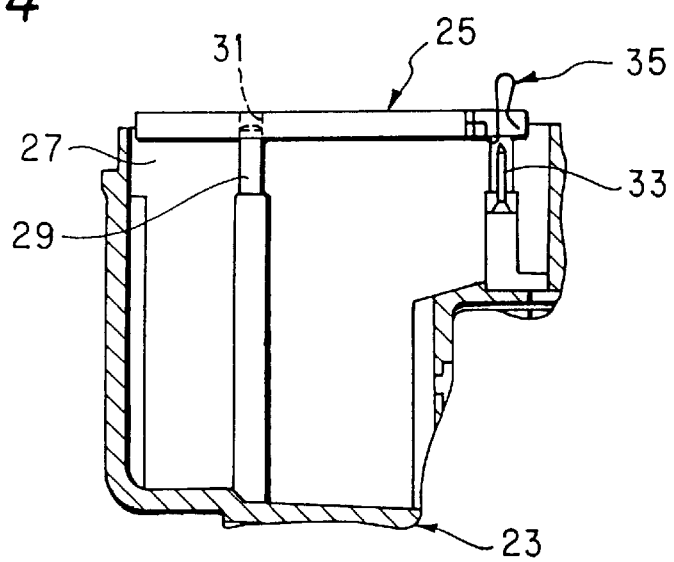
FIG. 4 is a sectional view of the wiring board mounting structure, showing the start of mounting the wiring board.
Figure 5:
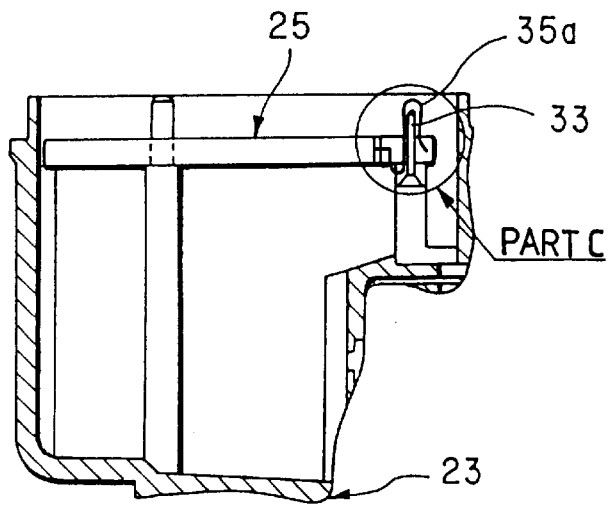
FIG. 5 is a sectional view of the wiring board mounting structure in which the wiring board has been mounted.
Figure 6:
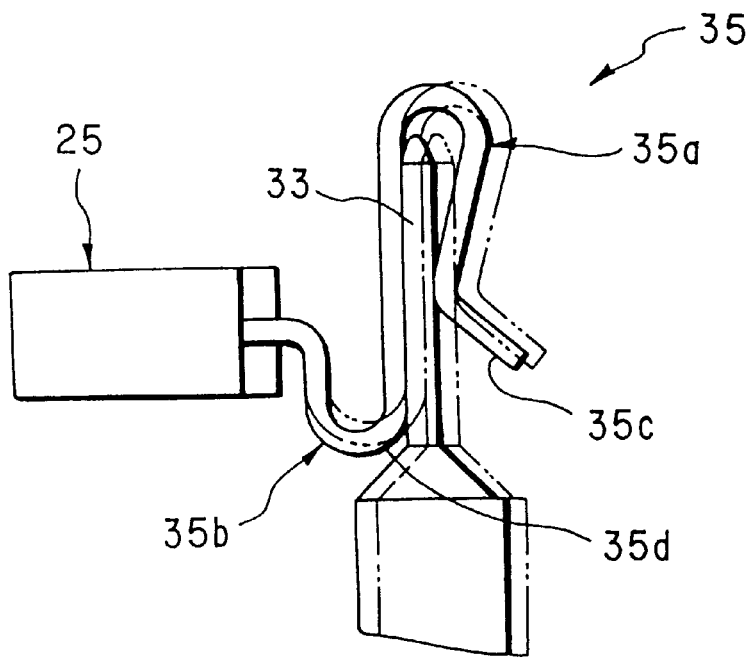
FIG. 6 is an enlarged view of the part "C" in FIG. 5.
Figure 7:
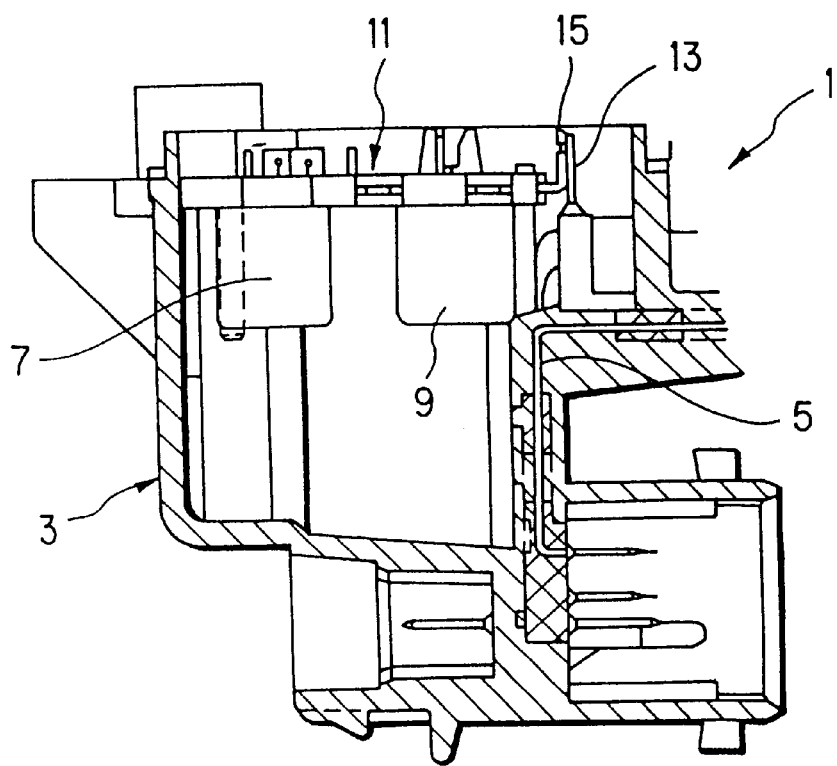
FIG. 7 is a sectional view showing a conventional wiring board mounting structure for an electrical junction block.

The function of the wiring board mounting structure thus constructed will be described with reference to FIGS. 4 through 6. As was described above, FIG. 4 is a sectional view of the wiring board mounting structure in which the mounting of the wiring board is started, FIG. 5 is a sectional view of the wiring board mounting structure in which the wiring board has been mounted, and FIG. 6 is an enlarged view of the part "C" in FIG. 5.

The relay board 25 is fitted in the relay board mounting section 27 with the bosses 29 engaged with the positioning holes 31. When the bosses 29 are fitted in the positioning holes 31, the bosses 29 regulates or prevents the movement of the relay board 25 in the direction of the plane thereof (horizontally), and allows the movement of the relay board 25 only in the direction of protrusion of the bosses 29 (vertically). Thus, the relay board 25 has been guided to the predetermined position in the relay board mounting section 27. At this time instant, the elastic terminals 35 are not brought into contact with the stationary terminals 33.

As the relay board 25 is further inserted into the relay board mounting section 27, the elastic contact portions 35a of the elastic terminals 35 are brought into contact with the stationary terminals 33 of the body 23. That is, as the relay board 25 is inserted into the relay board mounting section 27 along the bosses 29, the elastic contact portions 35a are so positioned as to meet the stationary terminals 33. When, under this condition the relay board 25 is pressed down, as shown in FIG. 5 the elastic contact portions 35a are elastically deformed to receive the stationary terminals 33, so that the former 35a are pressed against the latter 33. Thus, the elastic terminals 35 have been electrically connected to the stationary terminals 33.

In the case where, for instance because of manufacture error, the elastic contact portions 35a are shifted from the stationary terminals 33; that is, the former do not completely agree with the latter, the pointed end portions of the stationary terminals 33 abut against the guide pieces 35c (cf. FIG. 6) which are the end portions of the elastic contact portions 35a, or against the outwardly curved surfaces 35d of the position shift absorbing portions 35b. The stationary terminals 33 which abut against the guide pieces 35c or the outwardly curved surfaces 35d are caused to push the guide pieces 35c or the outwardly curved surfaces 35d as the relay board 25 are pressed down, so that the position shift absorbing portions 35b are elastically deformed. As a result, as shown in FIG. 6, the position of each of the elastic contact portions 35a is moved to meet the corresponding stationary terminal 33, thus absorbing the position shift. Thus, similarly as in the above-described case, the elastic contact portions 35a receive the stationary terminals 33; that is, the terminals 33 are positively fitted in the elastic terminals 35.

On the other hand, in the case where, for instance because of breakage of the relay, it is necessary to replace the relay board 25 with a new one, the relay board 25 is removed from the relay board mounting section 27 by moving the relay board 25 along the bosses 29. As a result, the engagements of the stationary terminals 33 with the elastic contact portions 35 are released. Accordingly, the relay board 25 can be removed from the body 23 with ease.

As was described above, in the wiring board mounting structure of the embodiment, the bosses 29 are protruded from the body 23, the positioning holes 31 are formed in the relay board 25, the stationary terminals 33 are extended from the body 23, and the elastic terminals 35 are extended from the relay board 25. Hence, the relay board 25 can be fitted in the body 23 being guided by the bosses 29. Therefore, the trouble of twist due to the position shaft of the relay board 25 is prevented; that is, the stationary terminals 33 are fixedly engaged with the elastic terminals 35 with high reliability. Hence, the relay board 25 can be readily attached to the body 23 and removed from the body 23. For instance, in the case where the relay is broken, only the relay board 25 is replaced with a new one, and the normal (not broken) components of the body 23 can be used as they are.

The electrical connection is achieved merely by pressing the relay board 25 into the body 23. Hence, the wiring board mounting structure of the invention is improved in work efficiency when compared with the conventional one in which it is necessary to spot-weld a plurality of small tabs.

Further, each of the elastic terminals 35 has the position shift absorbing portion 35b. Therefore, even if the elastic terminals suffer from position shift, for instance, because of manufacture error, the position shift absorbing portions 35b are elastically deformed to absorb the position shift; that is, to cause the elastic contact portions 35a to meet the stationary terminals 33.

In the above-described embodiment, the body 23 has the stationary terminals 33, and the relay board 25 has the elastic terminals; however, the invention is not limited thereto or thereby; that is, the wiring board mounting structure may be so modified that the body 23 has the elastic terminals, while the relay board 25 has the stationary terminals 33. This may be applied to the relation between the bosses 29 and the positioning holes 31.

As was described above, in the wiring board mounting structure of the invention, the position regulating means is provided for the body and the wiring board, and the body has the stationary terminals while the wiring board has the elastic terminals. Hence, when the wiring board is fitted in the body with the aid of the position regulating means, the stationary terminals are fixedly engaged with the elastic terminals with high reliability while the wiring board is being prevented from being twisted. Hence, the wiring board can be engaged with the body and removed from the body with ease. In the case where any component of the wiring board is broken, only the wiring board is removed from the body; that is, the replacement of a component can be achieved economically. Merely by press-fitting the wiring board into the body, the electrical connection of the terminals are accomplished, so that the assembling work of the wiring board mounting structure can be achieved with high efficiency.

What is claimed is:

1. An electrical junction box, comprising:
    a body in which an electrical circuit is formed;
    a wiring board in which another electrical circuit is formed, said wiring board being coupled to said body to complete connection of the electrical circuits;
    position regulating means provided in said body and said wiring board for guiding said wing board to a predetermined mounting position;
    a stationary terminal protruded from one of said body and said wiring board; and
    an elastic terminal protruded from the other of said body and said wiring board, said elastic terminal elastically contacting said stationary terminal when said wiring board is set at the mounting position in said body, wherein said elastic terminal has a substantially S-shape including a first U-shaped portion connected to the other of said body and said body wiring board and a second U-shaped portion inverted with respect to said first U-shaped portion and continuous therewith and wherein said stationary terminal is received in said second U-shaped portion and said first U-shaped portion allows for lateral movement of said second U-shaped portion.

2. The electrical junction box as claimed in claim 1, wherein said position regulating means includes bosses provided on said body, and positioning holes provided in said wiring board, said bosses being fitted in said positioning holes respectively.

3. The electrical junction box as claimed in claim 1, wherein said stationary terminal protrudes from said body, and said elastic terminal is protruded from said wiring board.

4. The electrical junction box as claimed in claim 1, wherein said elastic terminal includes an elastic contact portion which elastically contacts said stationary terminal, and a position shift absorbing portion which elastically displaces a position of said elastic contact portion to absorb a position shift thereof from said stationary terminal.

* * * * *